(12) United States Patent
Silva et al.

(10) Patent No.: US 12,123,528 B2
(45) Date of Patent: Oct. 22, 2024

(54) QUICK COUPLER FOR AUTOMOTIVE FLUID TRANSPORT TUBING

(71) Applicant: Sumitomo Riko Company Limited, Aichi (JP)

(72) Inventors: Paulo Geovane Silva, Juatuba-MG (BR); Rodolfo de Jesus Nogueira, Juatuba-MG (BR); Thiago Monteiro Lima, Juatuba-MG (BR)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/327,845

(22) Filed: Jun. 1, 2023

(65) Prior Publication Data

US 2023/0349496 A1    Nov. 2, 2023

Related U.S. Application Data

(63) Continuation of application No. PCT/JP2022/007379, filed on Feb. 22, 2022.

(30) Foreign Application Priority Data

Mar. 8, 2021    (BR) .......................... 102021004374-1

(51) Int. Cl.
  *F16L 37/091*    (2006.01)
  *F16L 37/098*    (2006.01)

(52) U.S. Cl.
  CPC ......... *F16L 37/091* (2013.01); *F16L 37/0985* (2013.01)

(58) Field of Classification Search
  CPC ... F16L 37/091; F16L 37/0985; F16L 37/098; F16L 37/133
  See application file for complete search history.

(56) References Cited

U.S. PATENT DOCUMENTS

| | | | |
|---|---|---|---|
| 5,269,572 A * | 12/1993 | Mefferd | |
| 6,155,607 A | 12/2000 | Hewitt et al. | |
| 6,481,759 B1 * | 11/2002 | Kawasaki | ........... F16L 37/0985 |
| 7,611,171 B2 | 11/2009 | Yoshino | |
| 7,690,694 B2 | 4/2010 | Poder | |
| 9,845,645 B2 * | 12/2017 | Hughes | |

(Continued)

FOREIGN PATENT DOCUMENTS

| | | |
|---|---|---|
| BR | 102017003694 | 10/2018 |
| CN | 204358306 | 5/2015 |

(Continued)

OTHER PUBLICATIONS

"International Search Report (Form PCT/ISA/210) of PCT/JP2022/007379", mailed on May 31, 2022, pp. 1-4.

(Continued)

*Primary Examiner* — William S. Choi
(74) *Attorney, Agent, or Firm* — JCIPRNET

(57) ABSTRACT

A quick coupler for automotive fluid transport tubing discloses a quick coupling element used on metallic tubing, particularly on tubing for automotive fluid transport. The quick coupler includes two locking members made in thermoplastic material, and the quick coupler being fitted on both a male fitting tube and a female fitting tube in order to join the tubes together and provide them with an anti-rotation safety system.

11 Claims, 14 Drawing Sheets

(56) References Cited

U.S. PATENT DOCUMENTS

| | | | | |
|---|---|---|---|---|
| 2005/0242580 A1* | 11/2005 | Mancinelli | ............ | F16L 37/098 |
| 2006/0220380 A1* | 10/2006 | Yoshino | .............. | F16L 37/0985 |
| 2008/0036206 A1* | 2/2008 | Li-guo | ................ | F16L 37/0985 |
| 2011/0121561 A1* | 5/2011 | Wang | .................... | F16L 37/133 |
| 2017/0114935 A1* | 4/2017 | Kujawski, Jr. | ........ | F16L 37/091 |
| 2021/0372551 A1* | 12/2021 | Clark | .................... | F16L 37/091 |

FOREIGN PATENT DOCUMENTS

| | | |
|---|---|---|
| DE | 102014107530 | 12/2015 |
| EP | 1972846 | 2/2012 |
| JP | 2006313010 | 11/2006 |

OTHER PUBLICATIONS

"Written Opinion of the International Searching Authority (Form PCT/ISA/237) of PCT/JP2022/007379", mailed on May 31, 2022, pp. 1-6.

Office Action of Japan Counterpart Application, with English translation thereof, issued on May 31, 2024, pp. 1-11.

* cited by examiner

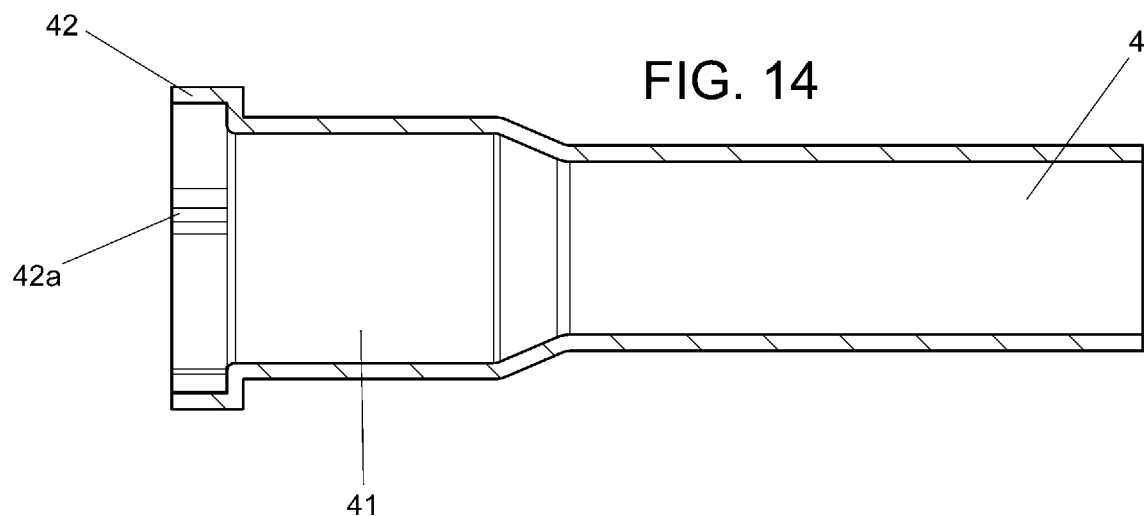
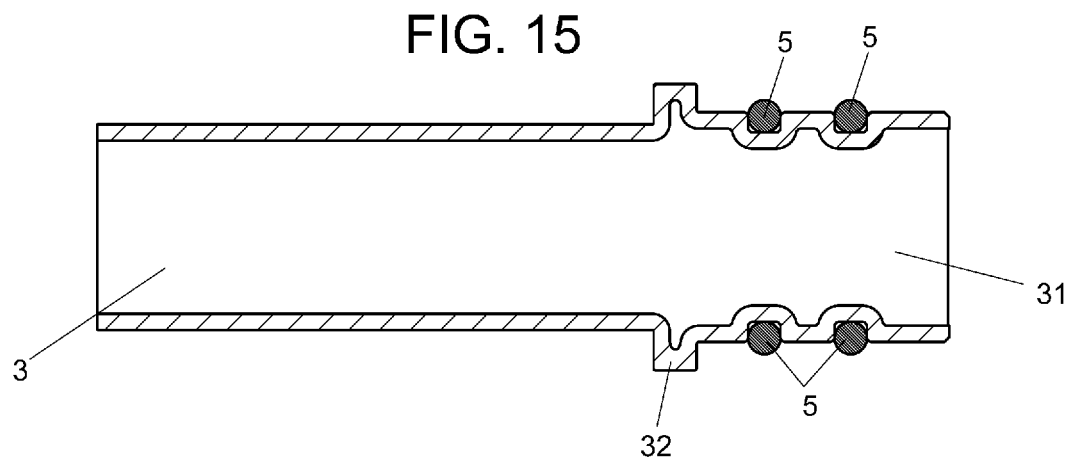

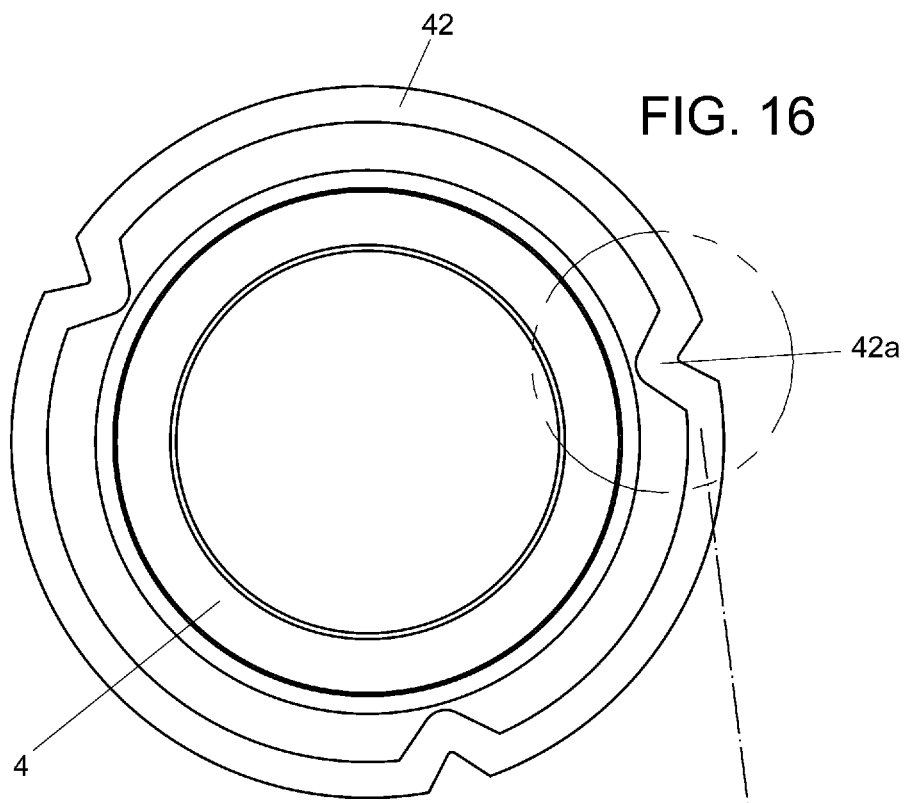
FIG. 16
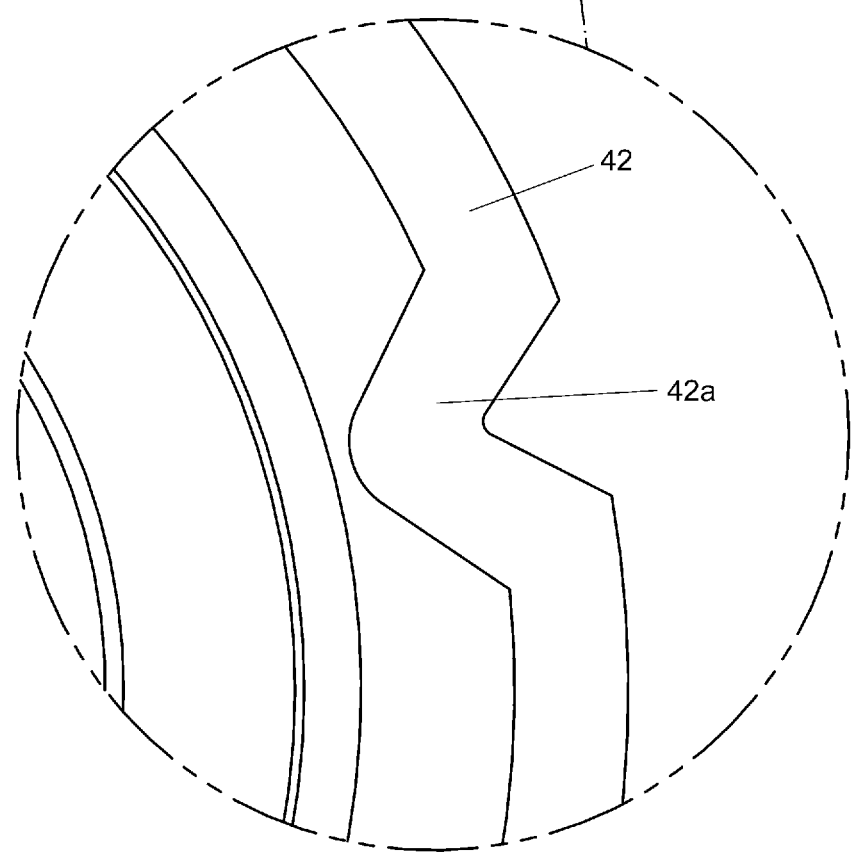

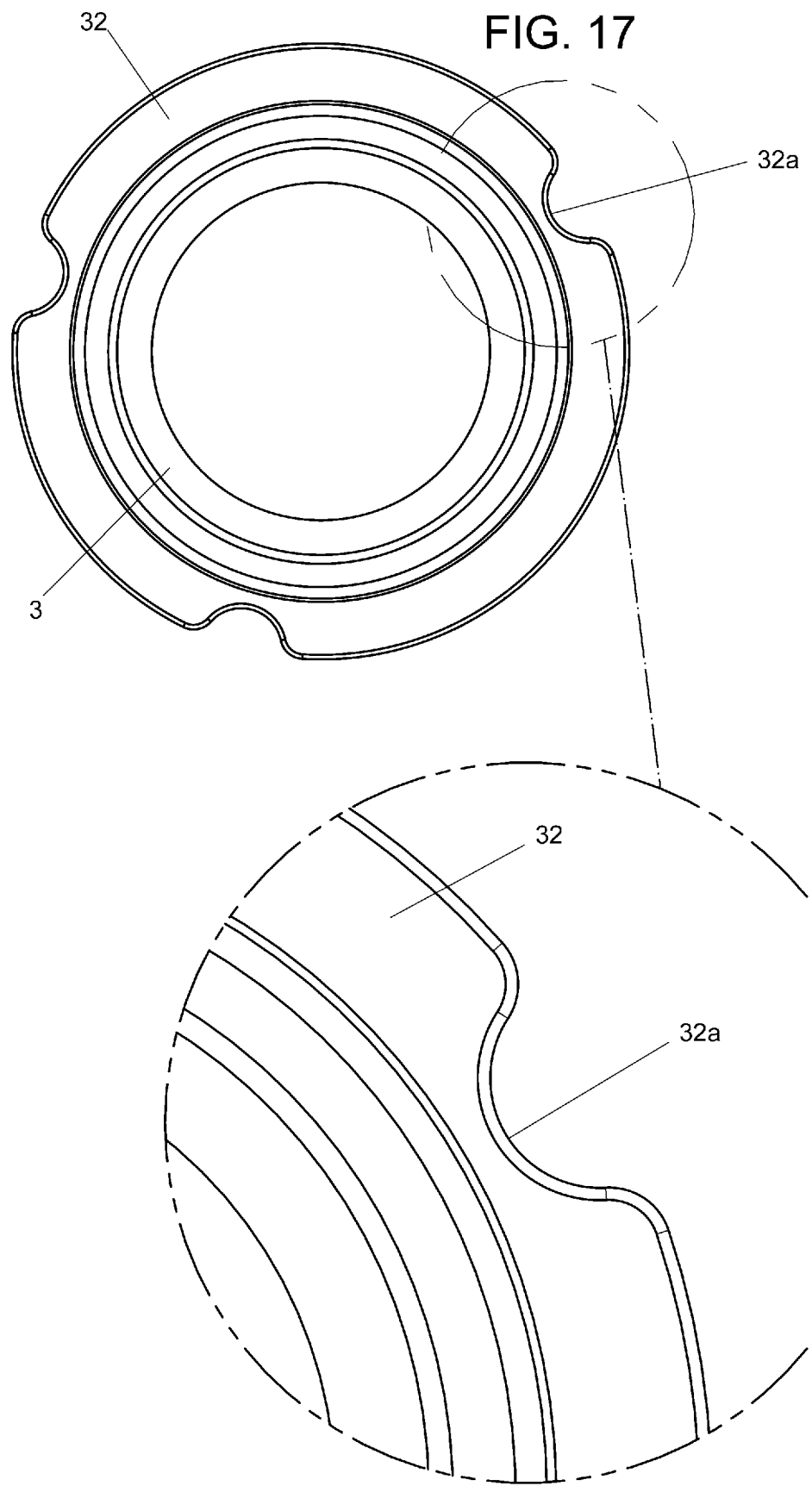

QUICK COUPLER FOR AUTOMOTIVE FLUID TRANSPORT TUBING

CROSS-REFERENCE TO RELATED APPLICATION

The present application is a continuation of PCT/JP2022/007379, filed on Feb. 22, 2022, and is related to and claims priority from Brazilian patent application no. 102021004374-1, filed on Mar. 8, 2021. The entire contents of the aforementioned applications are hereby incorporated by reference herein.

TECHNICAL FIELD

The disclosure relates to a quick-action coupling device, more specifically it relates to an innovative quick coupler to be used in automotive fluid transport tubing. The quick coupler presented herein was developed with specific technical features, presenting two locking members made in thermoplastic polymeric material, in order to use such locking members to join automotive tubing without using other devices, like bolts or tools, keeping them joined in a firm and safety manner.

BACKGROUND ART

As widely known by professionals who work for automotive industry, the vehicle tubing system has several functions, for instance, the transportation of fluids for the air conditioning hoses, hydraulic steering hoses, and equivalent ones. Such tubing system presents a complex structure for the transport of fluids, comprising diverse types of tubes and hoses configurated in a way to work with the other elements inside an automotive vehicle; therefore, the automotive tubing system requires connectors and couplers for coupling tubes, hoses and similar elements. A well-known example of such connectors is composed of two flanges in aluminum, bearing male and female fittings, joined together with bolts and nuts.

However, such kind of connectors present several problems related to the manufacturing and use thereof that have not been overcome yet. Since such quick couplers are usually made in metallic material, as the abovementioned connectors with flanges made in aluminum, there is the necessity of using complex and aggressive metallurgical processes, such as brazing, in order to manufacture them.

Regarding their installation, several connectors found in the art require specific tools and parts to be assembled, such as torque wrench, bolts or locking pins. Thereby, the assembly is complex and takes longer time, as well as they require hard maintenance due to the difficulties to disassemble such connectors, since they are joined with bolts and nuts. Besides, to do so, one needs to use tools to fasten them and to also join the tubes and hoses of the automotive tubing system in a firm and safety manner.

In order to bypass such problems, the related art presents some solutions, in particular that found in document CN204358306, which describes a quick coupler of air conditioning tubes for vehicles, made in thermoplastic material, comprising resilient tang provided with locating bump and sleeve, whose internal wall is provided with locating bump.

Other solution is presented in document BR 10 2017 003694-4, which relates to a quick coupler also made in thermoplastic material, comprising a male fitting tube, at least an adapter, at least a plastic clamp, at least a locking fitting, a female fitting tube, and a plurality of O-rings. The technology disclosed in that document found in the related art presents components manufactured by injection molding process, cold stamping, and mechanical deformation and interference—which may reduce the risk of fails, especially those originated as a consequence of the brazing process. In addition, the mentioned technology can be assembled and dissembled manually, without using specific tools, bolts, or locking pins. It is noteworthy that such solution is owned by the same applicant of the present patent of the disclosure; therefore, the disclosure presented herein has also the objective of improving the solution disclosed in such related art document.

However, the solutions disclosing quick-action connectors made in thermoplastic material found in the related art lack an essential element present in connectors with aluminum flange: an anti-rotation safety system for tubing. Without such anti-rotation system, the tubes that constitute the automotive tubing system may spin in different directions on the same axis, and this can compromise the said automotive tubing system, causing leaks of the liquid transported and, consequently, problems with apparatuses which depend on that fluids—such as air conditioning and hydraulic steering. In addition, without such anti-rotation system the tubes may twist, changing their original, carefully planned configuration and allowing other car elements to damage the said tubes.

The aforementioned problems caused by the lack of an anti-rotation safety system lead to, at least, remarkable problems to the vehicle user and serious accidents if such vehicle is in use—particularly if the hydraulic steering is damaged due to the impairment of the automotive tubing system.

Considering what was exposed, the related art would clearly benefit from a quick coupler for automotive tubing with two locking members made in thermoplastic material and an anti-rotation safety system, in order to provide a quick and efficient way to couple the tubes of the automotive tubing system, as well as provide a safety way to avoid damages to their structure and configuration.

SUMMARY

According to an embodiment of the disclosure, a quick coupler comprises two locking members coupled together and can be fitted on automotive tubing. And the said locking members provides the quick coupler with an anti-rotation safety system.

BRIEF DESCRIPTION OF DRAWINGS

FIG. 14 shows a longitudinal cross-sectional side view of the female fitting tube of the quick coupler for automotive fluid transport tubing.

FIG. 15 shows a longitudinal cross-sectional side view of the male fitting tube of the quick coupler for automotive fluid transport tubing.

FIG. 16 shows a frontal view of the female fitting tube of the quick coupler for automotive fluid transport tubing, showing details of the depressions of the anti-rotation safety system.

FIG. 17 shows a frontal view of the female fitting tube of the quick coupler for automotive fluid transport tubing, showing details of the depressions of the anti-rotation safety system.

DESCRIPTION OF EMBODIMENTS

Figure 1:
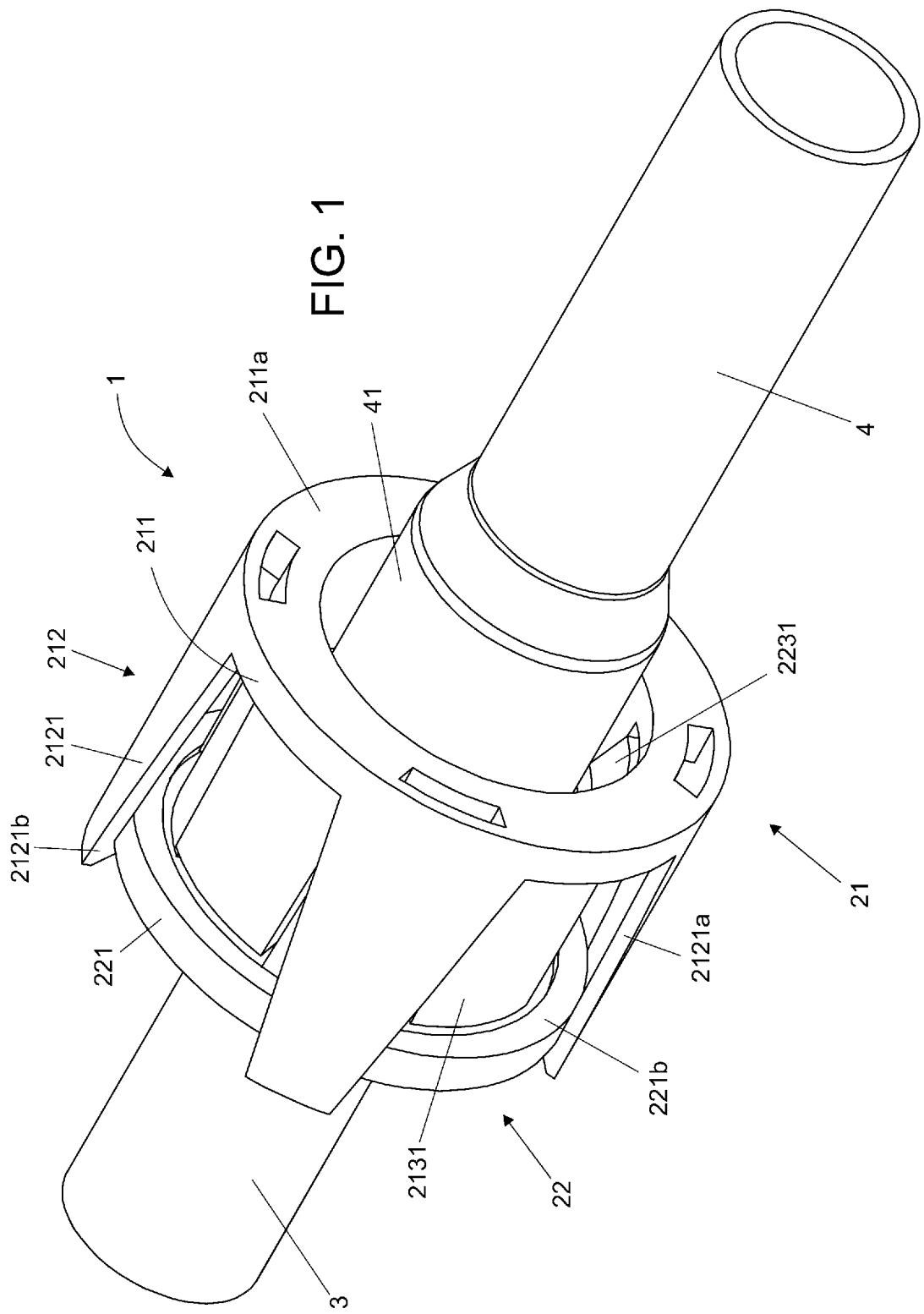
FIG. 1 shows a perspective view of the quick coupler for automotive fluid transport tubing entirely assembled.
Figure 2:
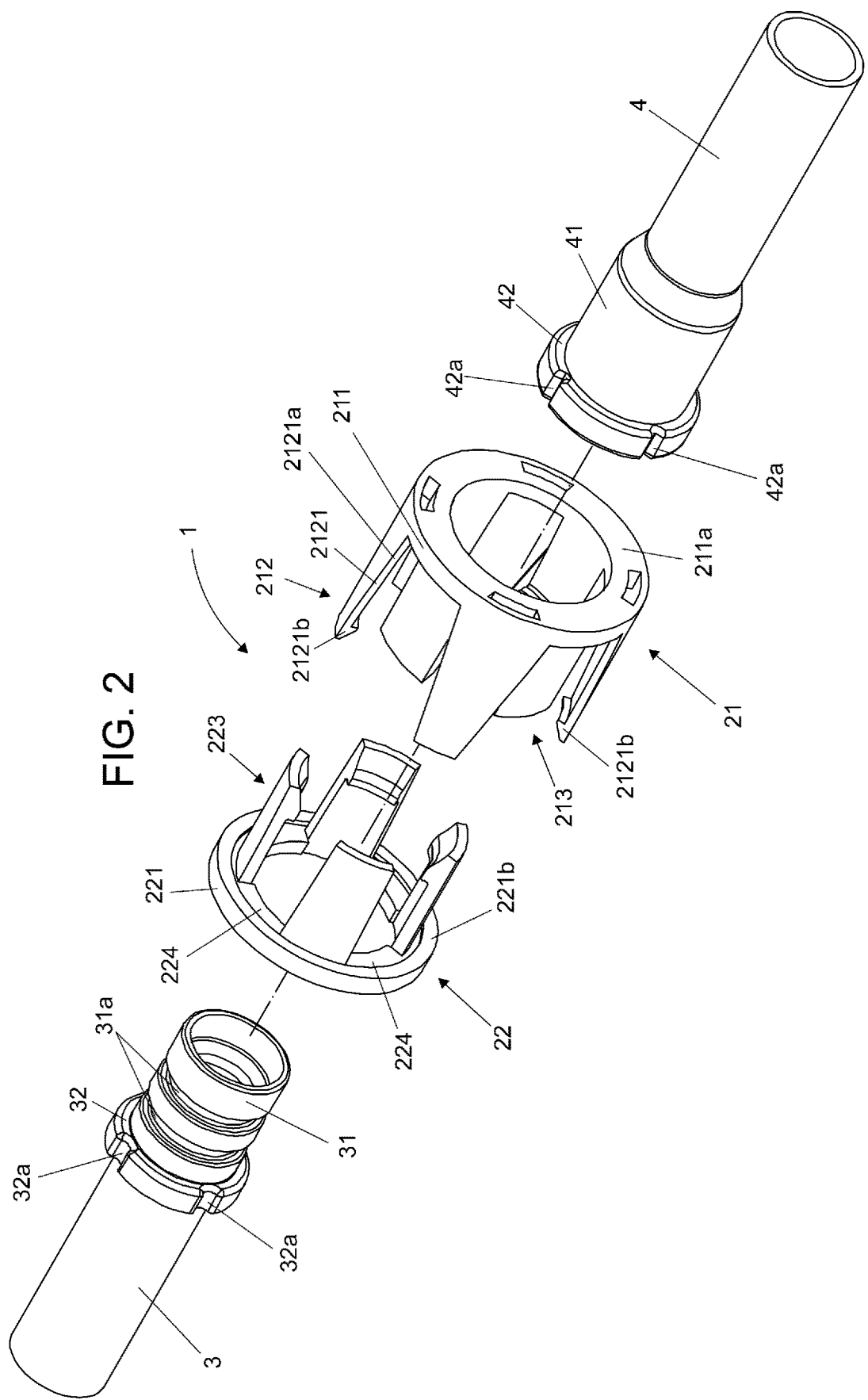
FIG. 2 shows an exploded perspective view of the quick coupler for automotive fluid transport tubing.
Figure 3:
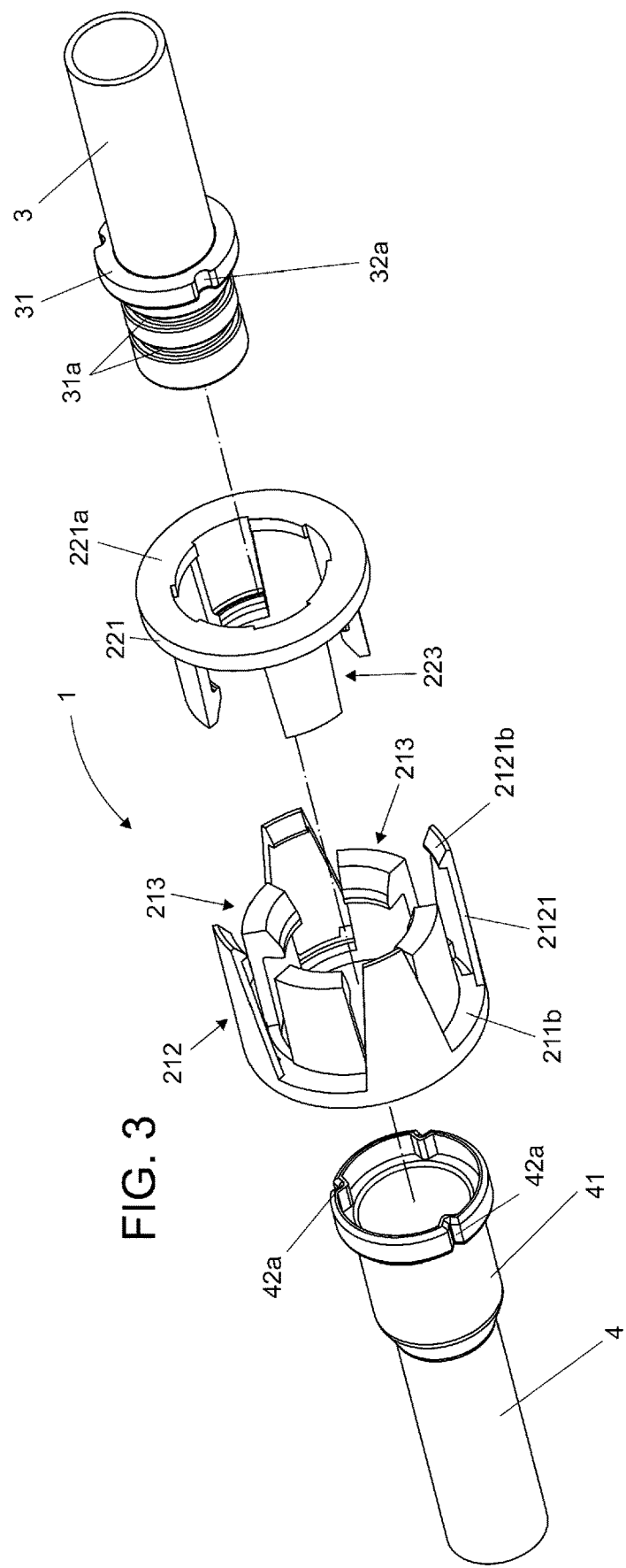
FIG. 3 shows an exploded inferior perspective view of the quick coupler for automotive fluid transport tubing.
Figure 4:
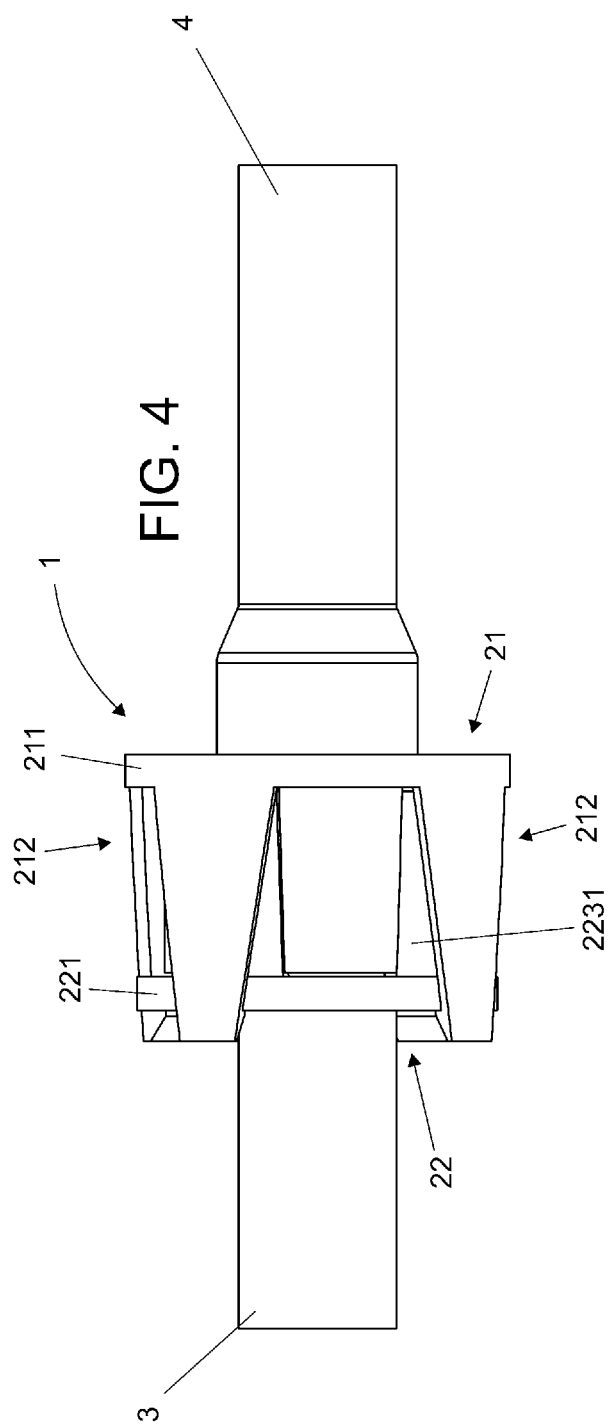
FIG. 4 shows a side view of the quick coupler for automotive fluid transport tubing.
Figure 5:
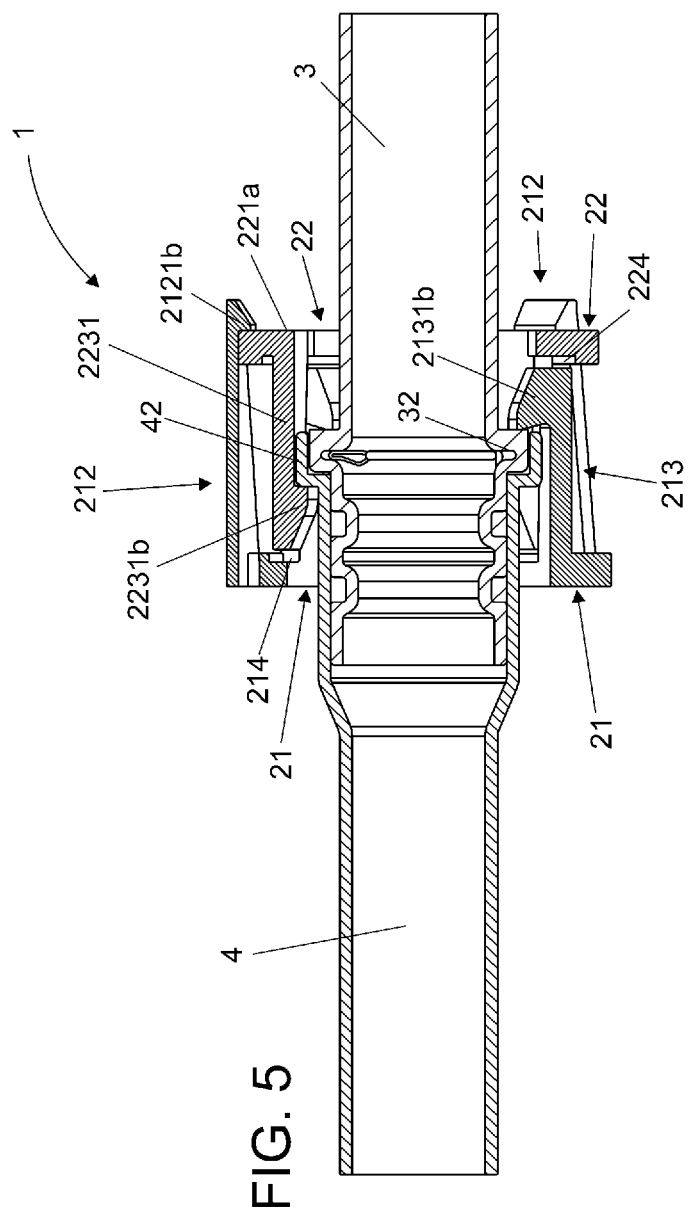
FIG. 5 shows a longitudinal cross-sectional side view of the quick coupler for automotive fluid transport tubing.
Figure 6:
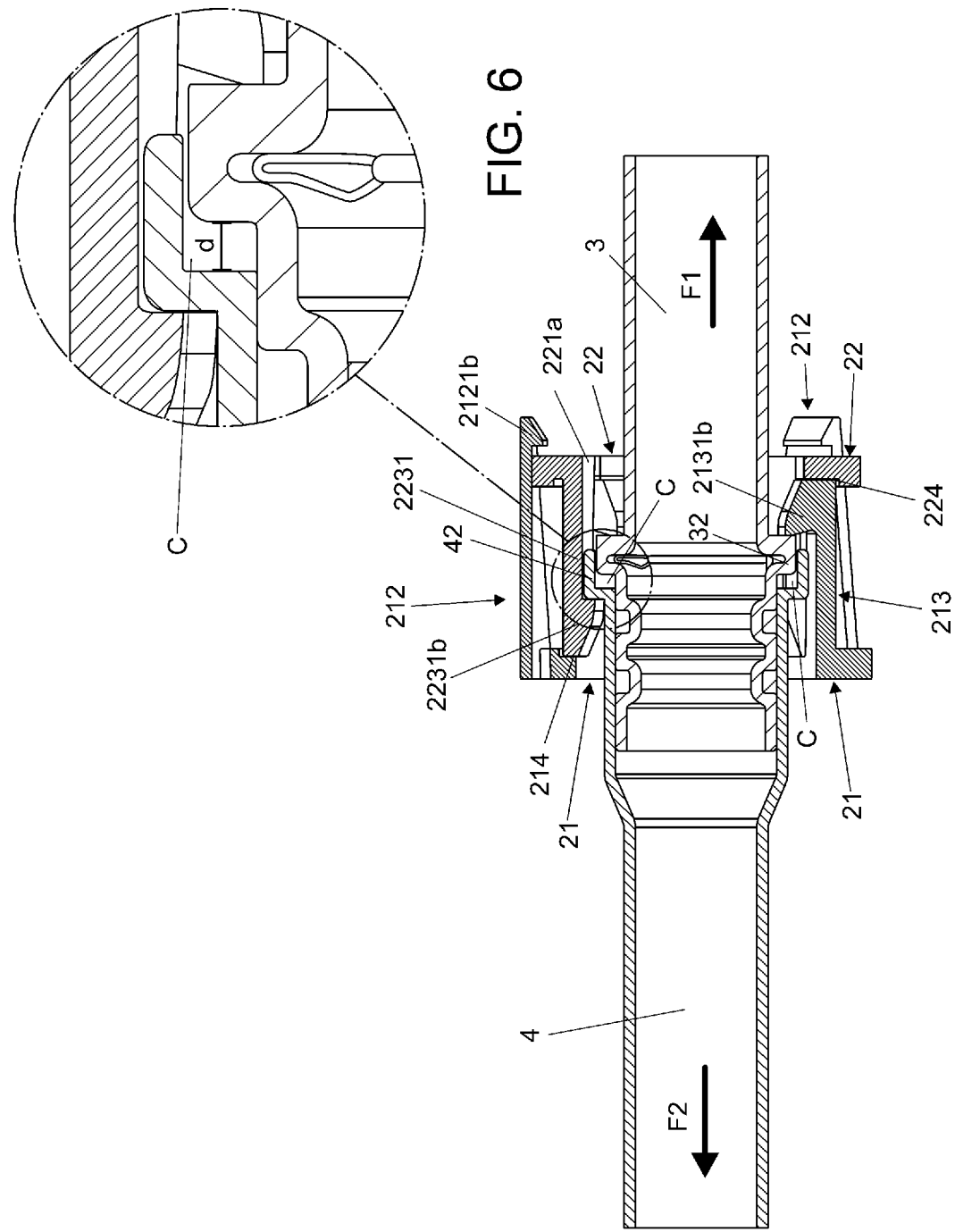
FIG. 6 shows a longitudinal cross-sectional side view of the quick coupler for automotive fluid transport tubing with such quick coupler in close detail.
Figure 7:
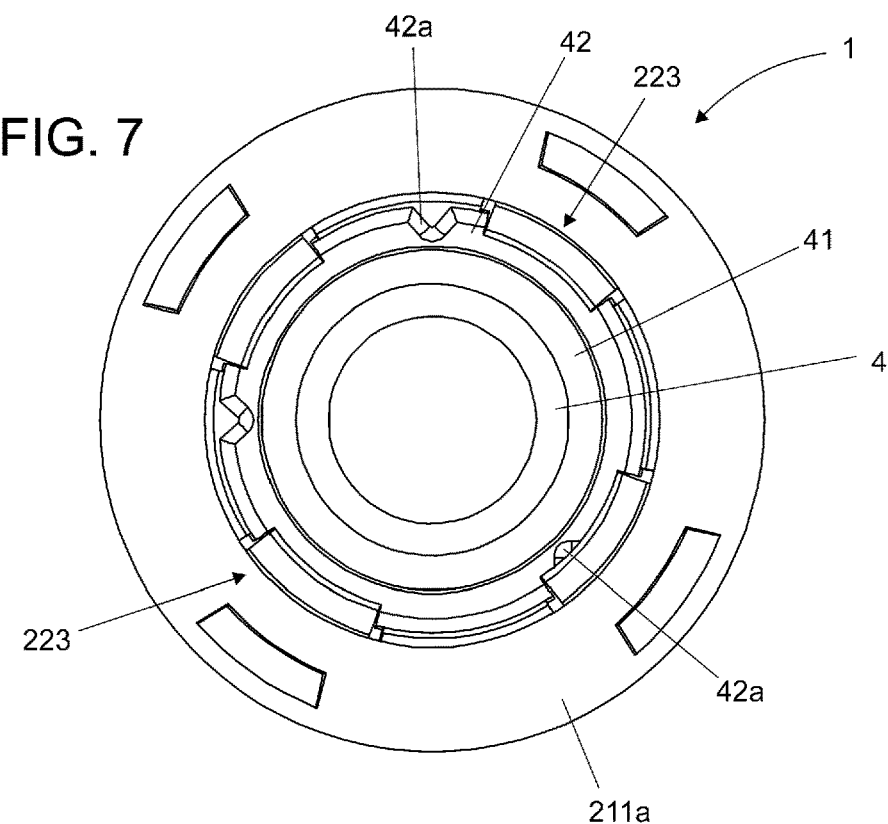
FIG. 7 shows a frontal view of the quick coupler for automotive fluid transport tubing.
Figure 8:
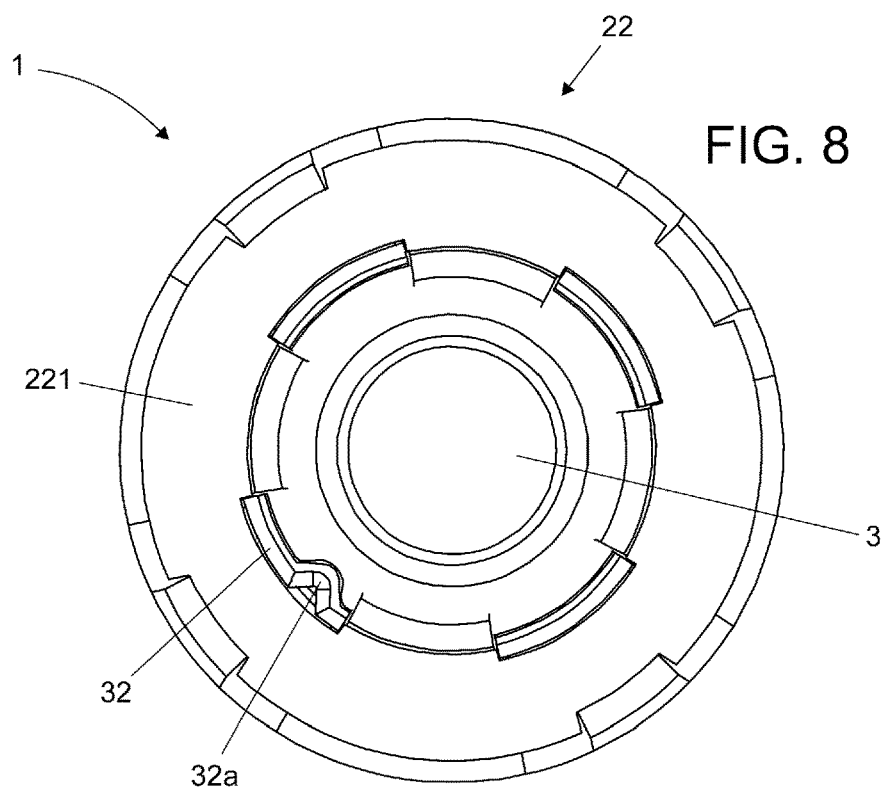
FIG. 8 shows a posterior view of the quick coupler for automotive fluid transport tubing.
Figure 9:
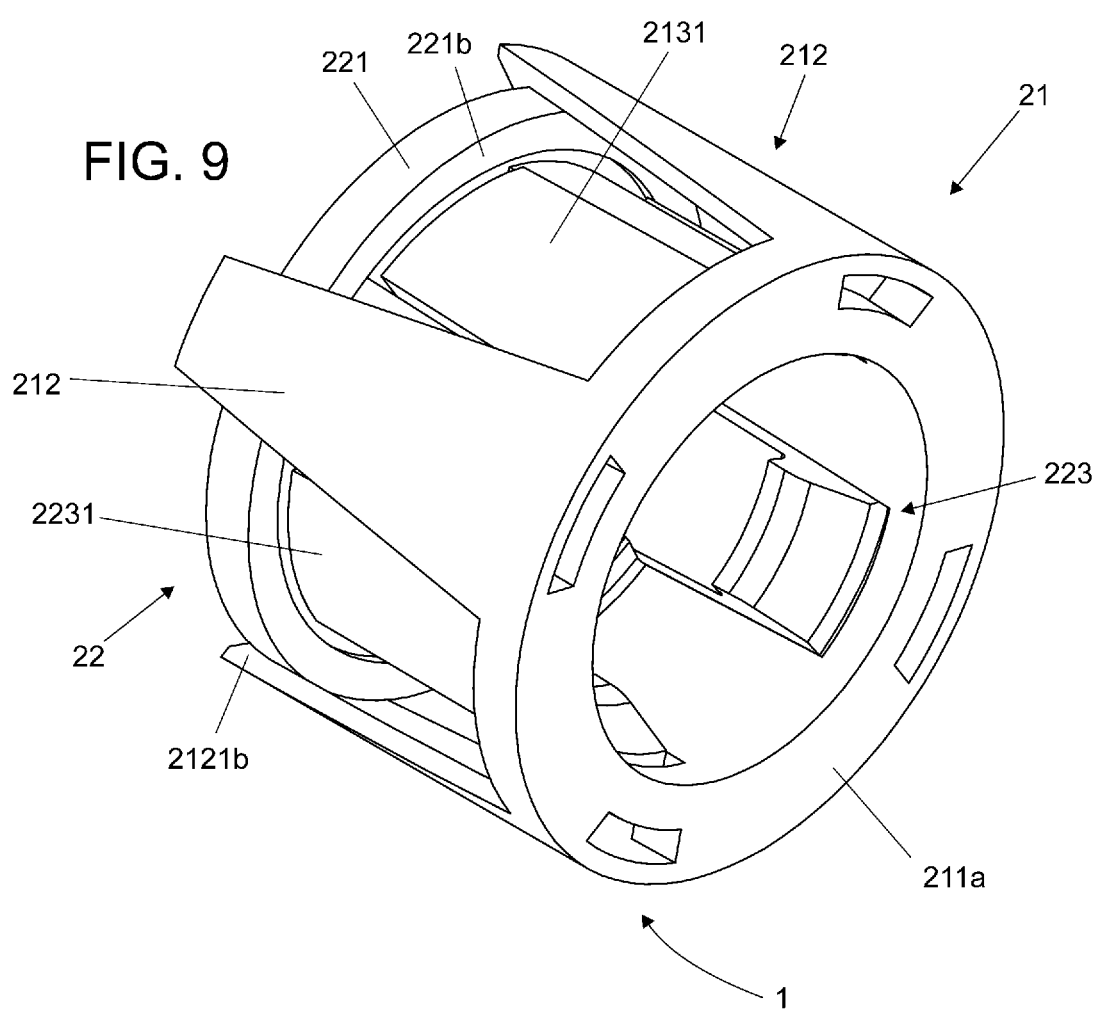
FIG. 9 shows a perspective view of the quick coupler for automotive fluid transport tubing without the male and female fitting tubes.
Figure 10:
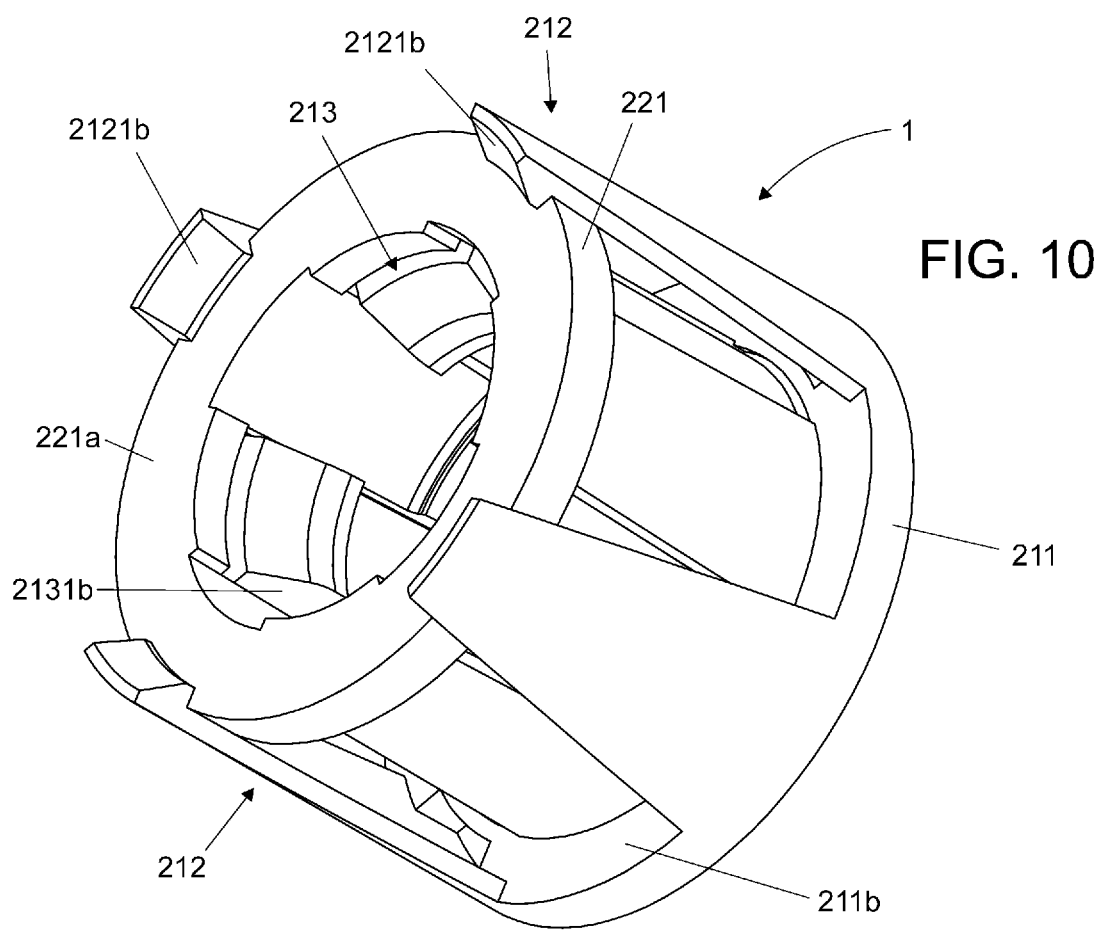
FIG. 10 shows a posterior perspective view of the quick coupler for automotive fluid transport tubing without male and female fitting tubes.
Figure 11:
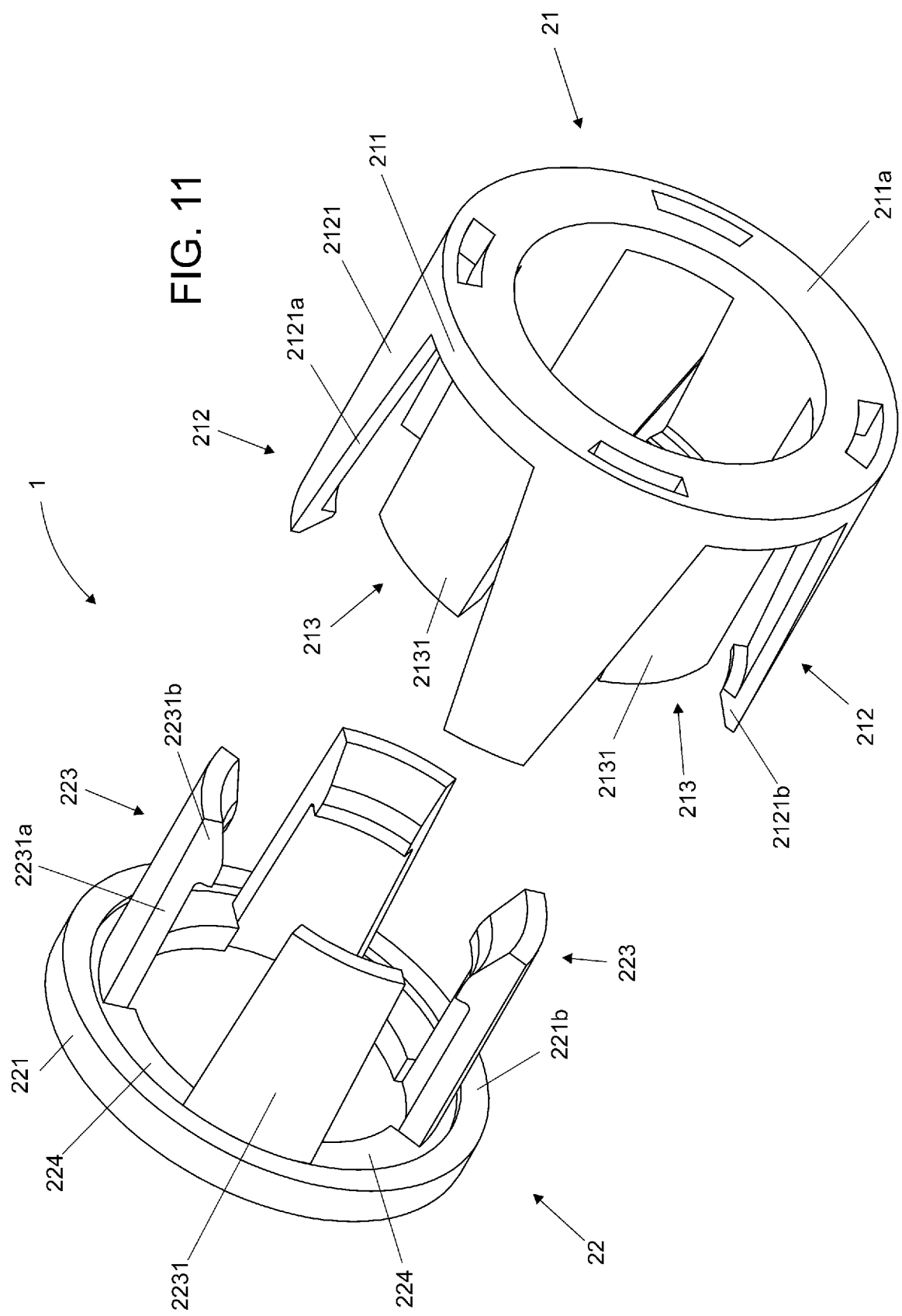
FIG. 11 shows an exploded perspective view of both locking members comprised by the quick coupler for automotive fluid transport tubing.
Figure 12:
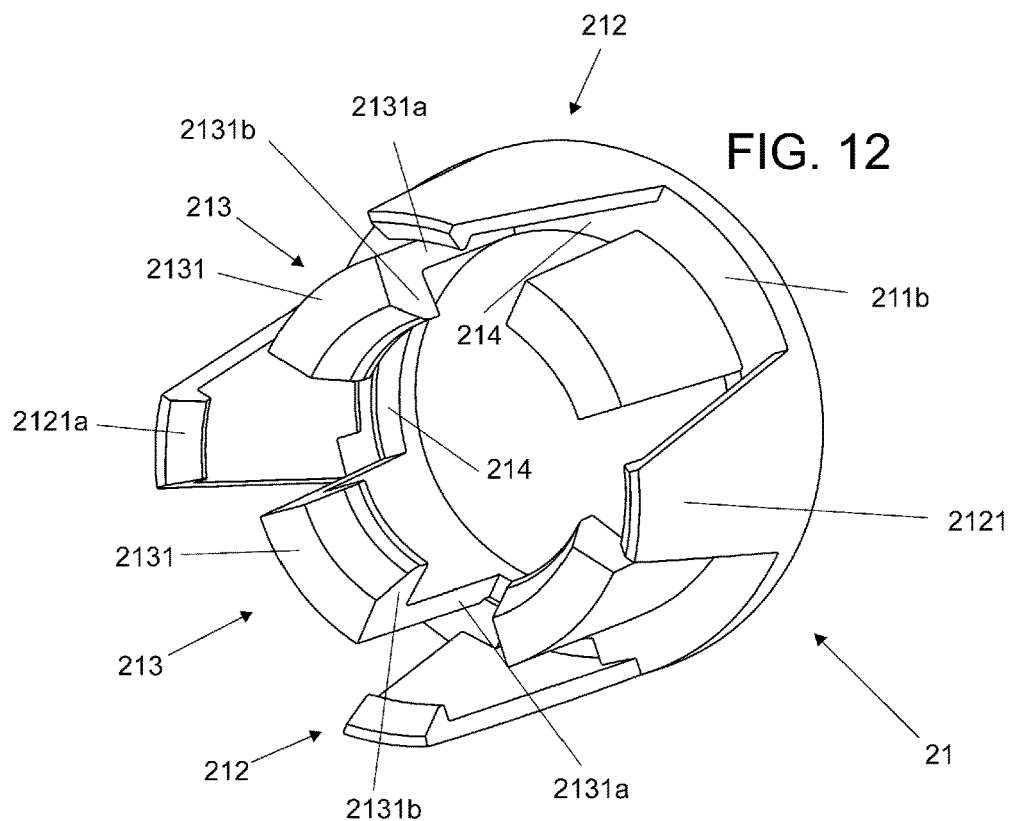
FIG. 12 shows a posterior perspective view of one of both locking members comprised by the quick coupler for automotive fluid transport tubing.
Figure 13:
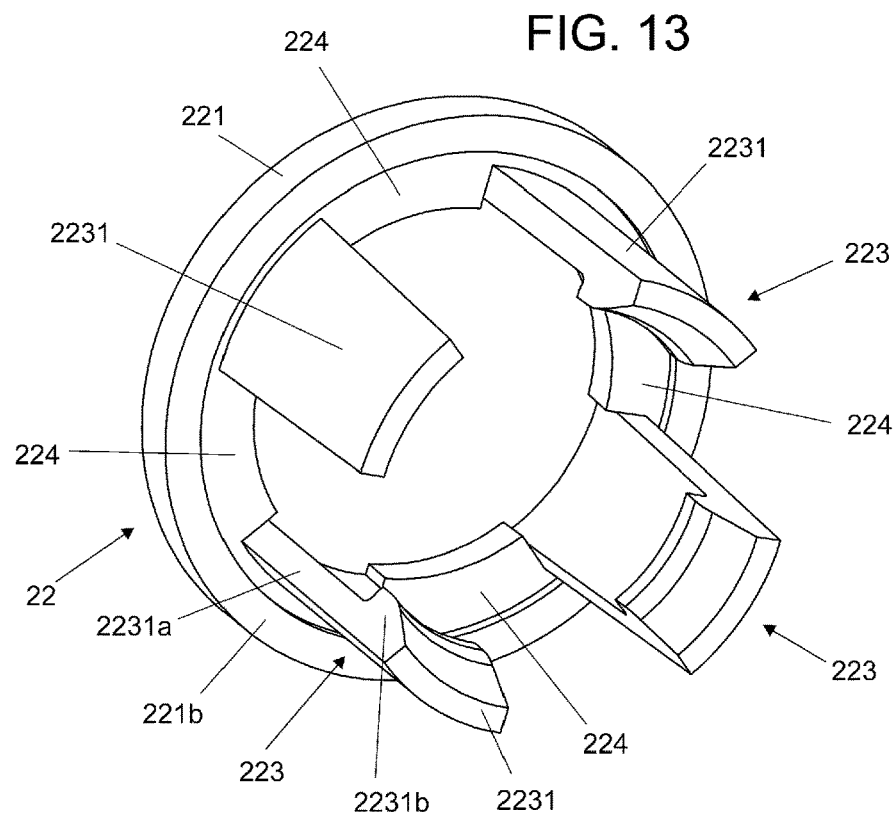
FIG. 13 shows a perspective view of one of both locking members comprised by the quick coupler for automotive fluid transport tubing.

Embodiments of the disclosure provide an innovative, ease-to-use, highly efficient quick coupler to be used with metallic tubes, particularly with automotive tubing for the transport of fluids, such as air conditioning hoses, hydraulic steering hoses and equivalent ones; having as main function to join the elements of the tubing ends in a quick and hand-operated manner, without using auxiliary devices as power screwdrivers.

In a first aspect, the disclosure relates to a quick coupler for automotive fluid transport tubing, comprising a quick coupler (1) used on metallic tubing, particularly on tubing for automotive fluid transport, such as, for instance, air conditioning hoses, hydraulic steering hoses and equivalent ones, wherein the said quick coupler (1) comprises two locking members (21) and (22) coupled together, so that such quick coupler (1) can fit on the automotive tubing, and such automotive tubing providing the quick coupler (1) with an anti-rotation safety system.

In an embodiment of the disclosure, said automotive tubing comprises a male fitting tube (3) and a female fitting tube (4) joined together, wherein the said quick coupler (1) can be fitted on such tubes (3) and (4) through the coupling of the locking member (21) on the male fitting tube (3) and through the coupling of the locking member (22) on the female fitting tube (4), so that the said fitting of the quick coupler (1) provides a simultaneous and irreversible joining of tubes (3) and (4).

In an embodiment of the disclosure, the locking member (21) comprises: a ring-shaped base (211) having an outer surface (211*a*) and an inner surface (211*b*); at least four outer teeth (212) spaced each other by gaps defined by the inner surface (211*b*); and at least four inner teeth (213) spaced each other by gaps, which are defined by at least four self-locking sockets (214) comprised in the inner surface (211*b*); so that both referred teeth (212) and (213) are not superimposed, being positioned concentrically to each other and extending perpendicularly from the inner surface (211*b*) of the ring-shaped base (211). The locking member (22), on the other hand, comprises: a ring-shaped base (221) having an outer surface (221*a*) and an inner surface (221*b*); and at least four inner teeth (223) spaced each other by gaps, which are defined by at least four self-locking sockets (224) comprised in the inner surface (221*b*); so that the said inner teeth (223) extend perpendicularly from the inner surface (221*b*) of the ring-shaped base (221); so that the said inner teeth (223) of the locking member (22) are superimposed in relation to the outer teeth (212) of the locking member (21); and the referred inner teeth (223) of the locking member (22) are accordingly aligned to the inner teeth (213) of the locking member (21).

In an embodiment of the disclosure, each one of the outer teeth (212) of the locking member (21) presents side profiles (2121) having a rectangle-shaped portion (2121*a*) and a triangle-shaped portion (2121*b*), wherein the said triangle-shaped portion (2121*b*) has a recess for the coupling of locking member (21) with the locking member (22). More specifically, the said recess of the triangle-shaped portion (2121*b*) provides the referred coupling by the direct contact thereof with the locking member (22) outer surface (221*a*). In addition, each one of the inner teeth (213) of the locking member (21) presents side profiles (2131), having a rectangle-shaped portion (2131*a*) and a triangle-shaped portion (2131*b*), and the said triangle-shaped portion (2131*b*) has a recess that allows the coupling of the locking member (21) with the male fitting tube (3). Likewise, each one of the inner teeth (223) of the locking member (22) has side profiles (2231) with both a rectangle-shaped portion (2231*a*) and a triangle-shaped portion (2231*b*), such triangle-shaped portion (2231*b*) presents a recess that allows the coupling of the locking member (22) with female fitting tube (4).

In an embodiment of the disclosure, each one of the self-locking sockets (214) of the locking member (21) admits the fitting of triangle-shaped portion (2231*b*) of each one of the inner teeth (223) of the locking member (22). Similarly, each one of the self-locking sockets (224) of the locking member (22) admits the fitting of the triangle-shaped portion (2131*b*) of each one of the inner teeth (213) of the locking member (21).

In an embodiment of the disclosure, the said locking members (21) and (22) are made in thermoplastic material, such as PA11, PA66 or PA6. In such a sense, the thermoplastic material composing the locking members (21) and (22) provides flexibility to the joining among teeth (212) and (213) with the ring-shaped base (211) and to the joining among teeth (223) with the ring-shaped base (221). For example, the locking members (21) and (22) may be manufactured by injection molding process.

In another aspect of the disclosure, the male fitting tube (3) comprises a tubular body extending up to an end (31) with larger diameter, having at least a groove (31*a*) around the tubular body where O-rings (5) are placed on. Between the tubular body of the male fitting tube (3) and the end (31), there is a disc (32) with larger diameter and perpendicular to both the axis of the male fitting tube (3) and the end (31) thereof, provided with at least three rounded depressions (32*a*), perpendicular to the longitudinal axis of the male fitting tube (3), and distributed radially on the said disc (32) surface.

In another aspect of the disclosure, the female fitting tube (4) comprises a tubular body having a smaller diameter extending up to a sector (41) with larger diameter. In such a sector (41) there is a recess surrounded at the end by a rim (42) perpendicularly to the axis of the female fitting tube (4). On such rim (42), there are at least three triangle-shaped depressions (42a), perpendicular to the longitudinal axis of the female fitting tube (4), corresponding to the depressions (32a).

So, the male fitting tube (3) joins to the female fitting tube (4) through the end (31), and such end (31) joins to the recess of the sector (41) until it fully covers such end (31). Similarly, the said joining also occurs in a way that the rim (42) fully covers disc (32). In some embodiments, both male fitting tube (3) and female fitting tube (4) are preferentially made of non-flexible materials, such as metal. Alternatively, both tubes (3) and (4) may be made of flexible materials, such as rubbers and plastics. In addition, both tubes (3) and (4) are formed by expanding process, which is followed by a second expansion, and subsequently submitted to a shape rolling process in order to form the groove (31a).

In order to join the said male fitting tube (3) with the female fitting tube (4) in a simultaneous and irreversible manner (fixing the joining), the quick coupler (1) is to be used. In such a context, the inner teeth (213) of the locking member (21) couples to the disc (32) of the male fitting tube (3) and the inner teeth (223) of the locking member (22) couples to the rim (42) of the female fitting tube (4). So, both tubes (3) and (4) keep firmly connected in an irreversible manner while quick coupler (1) is fitted, since both locking members (21) and (22) of the said quick coupler (1) are coupled to both male fitting tube (3) and female fitting tube (4), respectively, and the locking members (21) and (22) are coupled to each other by the outer teeth (212). Due to the flexibility of inner teeth (213) and (223), especially as to the rectangle-shaped portions (2131a) and (2231a) of the respective side profiles (2131) and (2231), the quick coupler (1) promptly fits on tubes (3) and (4) through the coupling of the locking members (21) and (22) on tubes (3) and (4), respectively. For this, one only needs to force the said locking members (21) and (22) on tubes (3) and (4), respectively, for moving the inner teeth (213) and (223), which return to their initial position. Then the quick coupler (1) of the disclosure will keep firm the automotive fluid transport tubing in a simple and efficient manner.

For the fitting of the quick coupler (1) in an exemplary embodiment, the locking member (21) is initially coupled to the rim (42), perpendicularly to the axis of tube (4), so the end (31) is fitted into the sector recess (41) for the locking member (22) couples to the disc (32).

Particularly, the referred fitting of the quick coupler (1) specially occurs because the inner teeth (213) and (223) present triangle-shaped portions (2131b) and (2231b) for the profiles (2131) and (2231), respectively, with elongated bodies which are connected to both ring-shaped base (211) and ring-shaped base (221), respectively. In addition, the referred fitting of the quick coupler (1) is also carried out due the presence of rectangle-shaped portions (2131a) and (2231a), wherein the said rectangle-shaped portions (2131a) and (2231a) are the most flexible portions of the locking members (21) and (22), respectively. So, said rectangle-shaped portions (2131a) and (2231a) in combination with the respective triangle-shaped portions (2131b) and (2231b) of their respective teeth (213) and (223) compose a fitting which allows the sliding and fitting of rim (42) and disc (32), and also halts that tubes (3) and (4) disengage (irreversible joining in the presence of the quick coupler (1) which was fitted).

The presence of both self-locking sockets (214) and (224) cooperates with the said simultaneous and irreversible joining, since when a force (F1) and a force (F2) in opposite directions (in any way, either horizontally or inclined) are applied to tubes (3) and (4), respectively, in order to disengage them, said self-locking sockets (214) and (224) preclude the said disengage, leading to the irreversible joining. In order to better exemplify the role of self-locking sockets (214) and (224) in such irreversible joining, precluding the said disengage, please find below, in more details, the referred application of forces (F1) and (F2) on tubes (3) and (4):

the action of forces (F1) and (F2) in opposite directions (and in any way) promotes a consequent movement of attraction between locking members (21) and (22), in relation to each other;

during the attraction movement of the locking members (21) and (22), in relation to each other, the rim (42) applies a force on each one of the recesses of the triangle-shaped portions (2231b) of each one of the inner teeth (223) of the locking member (22); consequently, each one of the triangle-shaped portions (2231b) moves towards each one of the self-locking sockets (214) of the locking member (21);

during the attraction movement of the locking members (21) and (22), in relation to each other, the disc (32) applies a force one each one of the recesses of the triangle-shaped portions (2131b) of each one of the inner teeth (213) of the locking member (21); consequently, each one of the triangle-shaped portions (2131b) moves towards each one of the self-locking sockets (224) of the locking member (22);

the said forces applied by the rim (42) and the disc (32) occur simultaneously during the attraction movement of the locking members (21) and (22), in relation to each other;

the attraction movement of the locking members (21) and (22) is halted when each one of the triangle-shaped portions (2231b) touches each one of the self-locking sockets (214) of the locking member (21) and each one of the triangle-shaped portions (2131b) touches each one of the self-locking sockets (224) of the locking member (22), so that the said self-locking sockets (224) accommodates the triangle-shaped portions (2131b) to stop the movement of the locking member (21) in relation to the locking member (22) and the said self-locking sockets (214) accommodates the triangle-shaped portions (2231b) to stop the movement of the locking member (22) in relation to the locking member (21); and immediately after the attraction movement of the locking members (21) and (22) is halted, a cavity (C) is formed configurating a distance (d) between the rim (42) and the disc (32), the said distance (d) corresponds to the maximum distance between tubes (3) and (4), the said maximum distance keeps the joining between the tubes (3) and (4), and the said maintenance of joining shows a representation of such simultaneous and irreversible joining.

In an embodiment of the disclosure, both force (F1) and force (F2) coexist in opposite directions horizontally.

In an embodiment of the disclosure, a force (F1) is applied in the absence of force (F2), i.e., force (F2)=0. In such configuration, the behavior of quick coupler (1) is similar to the configuration wherein both forces (F1) and (F2) coexist, such as described herein.

In an embodiment of the disclosure, force (F2) is applied in the absence of force (F1), i.e., force (F1)=0. In such configuration, the behavior of quick coupler (1) is similar to the configuration wherein both forces (F1) and (F2) coexist, such as described herein.

In an embodiment of the disclosure, force (F1) presents values between 0 and 2400 N, either in the presence or absence of force (F2).

In an embodiment of the disclosure, force (F2) presents values between 0 and 2400 N, either in the presence or absence of force (F1).

In an embodiment of the disclosure, the distance (d) ranges from 0 to 2.2 mm, so that (d)=0 shows that rim (42) abuts disc (32), i.e., the configuration before forces (F1) and/or (F2) are applied. On the other hand, the values for (d)>0 show a configuration in which cavity (C) is formed.

In another embodiment of the disclosure, O-rings (5) of the male fitting tube (3) carry out the sealing of quick coupler (1), halting undesired impurities to get in.

In addition, due to both depressions (32a) and (42a) of their respective tubes (3) and (4), the quick coupler (1) provides the tubing that it is coupled to with an anti-rotation safety system, because once both depressions (32a) and (42a) are correspondent, they fit each other when the male fitting tube (3) joins to the female fitting tube (4); then depressions (42a) cover depressions (32a) and, thus, the male fitting tube (3) and/or the female fitting tube (4) cannot rotate independently of each other, i.e., they cannot rotate in different directions. Therefore, the integrity of the tubing which the quick coupler (1) is fitted on is maintained for a long period.

It is to be understood that the present disclosure does not limit the application of this disclosure to the details described herein, and that it is capable of being applied in other embodiments and to be practiced or performed in a variety of ways within the scope of the claims. Although specific terms have been used, such terms should be interpreted in a generic and descriptive sense, and not for the purpose of limiting them.

What is claimed is:

1. A quick coupler for automotive fluid transport tubing, the quick coupler comprising a first locking member and a second locking member coupled together, so that such quick coupler can fit on the automotive fluid transport tubing, and the automotive fluid transport tubing has an anti-rotation safety system, wherein the automotive fluid transport tubing comprises a male fitting tube and a female fitting tube joined together, wherein the quick coupler can fit on the male fitting tube and the female fitting tube through the coupling of the first locking member on the male fitting tube and through the coupling of the second locking member on the female fitting tube, so that the fitting of the quick coupler provides a simultaneous and irreversible joining of the male fitting tube and the female fitting tube, wherein:

the first locking member comprises:
a ring-shaped base having an outer surface and an inner surface;
at least four outer teeth spaced from each other by gaps defined by the inner surface; and
at least four inner teeth spaced from each other by gaps, which are defined by at least four self-locking sockets comprised in the inner surface, so that both the at least four outer teeth and the at least four inner teeth are not superimposed, being positioned concentrically to each other and extending perpendicularly from the inner surface of the ring-shaped base; and the second locking member comprises:
a ring-shaped base having an outer surface and an inner surface;
at least four inner teeth spaced from each other by gaps, which are defined by at least four self-locking sockets comprised in the inner surface;
so that the at least four inner teeth extend perpendicularly from the inner surface of the ring-shaped base;
so that the inner teeth of the second locking member are superimposed in relation to the at least four outer teeth of the first locking member, and the at least four inner teeth of the second locking member are accordingly aligned to the at least four inner teeth of the first locking member.

2. The quick coupler, according to claim 1, wherein:
each one of the outer teeth of the first locking member presents side profiles having a rectangle-shaped portion and a triangle-shaped portion, wherein the triangle-shaped portion has a recess for the coupling of the first locking member with the second locking member;
each one of the inner teeth of the first locking member presents side profiles, having a rectangle-shaped portion and a triangle-shaped portion, and the triangle-shaped portion has a recess that allows the coupling of the first locking member with the male fitting tube; and
each one of the inner teeth of the second locking member has side profiles with both a rectangle-shaped portion and a triangle-shaped portion, such triangle-shaped portion presents a recess that allows the coupling of the second locking member with the female fitting tube.

3. The quick coupler, according to claim 2, wherein:
each one of the self-locking sockets of the first locking member admits the fitting of triangle-shaped portion of each one of the inner teeth of the second locking member; and
each one of the self-locking sockets of the second locking member admits the fitting of the triangle-shaped portion of each one of the inner teeth of the first locking member.

4. The quick coupler, according to claim 1, wherein the male fitting tube comprises a tubular body extending up to an end with larger diameter, having at least one groove around the tubular body where at least one O-ring is placed on; besides and between the tubular body of the male fitting tube and the end, there is a disc with larger diameter and perpendicular to both a longitudinal axis of the male fitting tube and the end thereof, provided with at least three rounded depressions, perpendicular to the longitudinal axis of the male fitting tube, and distributed radially on the disc surface.

5. The quick coupler, according to claim 4, wherein the female fitting tube comprises a tubular body, having a smaller diameter extending up to a sector with a larger diameter, the sector comprising a recess surrounded at the end by a rim perpendicularly to the axis of the female fitting tube, wherein on the rim there are at least three triangle-shaped depressions, perpendicular to the longitudinal axis of the female fitting tube, and corresponding to the at least three rounded depressions.

6. The quick coupler, according to claim 5, wherein the male fitting tube joins to the female fitting tube through the end, in which the recess of the sector fits until the sector fully covers the end, wherein the disc is fitted into the rim up to the disc is fully covered.

7. The quick coupler, according to claim 5, wherein the anti-rotation safety system of the quick coupler occurs through the at least three rounded depressions and the at least three triangle-shaped depressions of respective male fitting tube and female fitting tube, wherein both the at least three rounded depressions and the at least three triangle-shaped depressions are coupled together when the male fitting tube joins to the female fitting tube.

8. The quick coupler, according to claim 1, wherein both the male fitting tube and the female fitting tube are made of non-flexible materials or flexible materials.

9. The quick coupler, according to claim 1, wherein both the male fitting tube and the female fitting tube are formed by an expanding process, which is followed by a second expansion, and subsequently submitted to a shape rolling process in order to form a groove.

10. The quick coupler, according to claim 1, wherein the simultaneous and irreversible joining is kept through an application of a first force to the male fitting tube and a second force to the female fitting tube, the first force and the second force are applied in opposite directions, so that the simultaneous and irreversible joining allows a maximum distance between the male fitting tube and the female fitting tube, wherein:
the first force presents values between 0 and 2400 N;
the second force presents values between 0 and 2400 N; and
maximum distance ranges from 0 to 2.2 mm.

11. The quick coupler, according to claim 1, wherein the simultaneous and irreversible joining is kept through an application of a first force to the male fitting tube or a second force to the female fitting tube, so that the simultaneous and irreversible joining allows a maximum distance between the male fitting tube and the female fitting tube, and such maximum distance ranges from 0 to 2.2 mm, wherein:
the first force presents values between 0 and 2400 N; or
the second force presents values between 0 and 2400 N.

* * * * *